Figure 1:
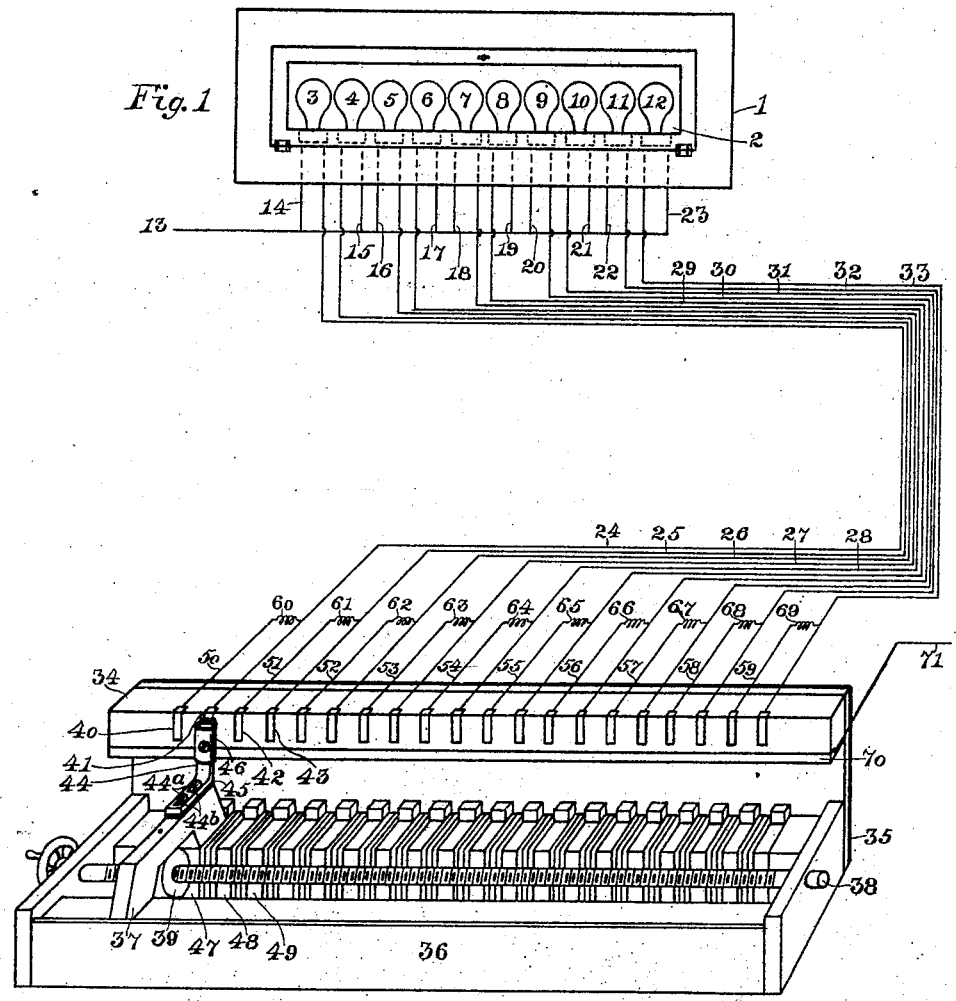

No. 690,800. Patented Jan. 7, 1902.
A. C. WALTHER.
BATTERY END CELL SWITCH INDICATOR.
(Application filed Apr. 19, 1901.)

(No Model.)

WITNESSES:
William B. Thomas
R. Clinton Balinger.

INVENTOR
Arthur C. Walther,
BY Edwin Guthrie
ATTORNEY.

THE NORRIS PETERS CO., PHOTO-LITHO., WASHINGTON, D. C.

UNITED STATES PATENT OFFICE.

ARTHUR C. WALTHER, OF BROOKLYN, NEW YORK.

BATTERY-END-CELL SWITCH-INDICATOR.

SPECIFICATION forming part of Letters Patent No. 690,800, dated January 7, 1902.

Application filed April 19, 1901. Serial No. 56,561. (No model.)

*To all whom it may concern:*

Be it known that I, ARTHUR C. WALTHER, a citizen of the United States, residing at Brooklyn, in the county of Kings and State of New York, have invented certain new and useful Improvements in Battery-End-Cell Switch-Indicators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to battery-end-cell switch-indicators, and is designed particularly for use with storage batteries.

The object of my invention is to produce an apparatus which may be located remote from the battery—for example, in the engine and dynamo room—that will show at a glance to the engineer or attendant the position of the switch which delivers the battery-current to or from the main or lead wires with respect to a number of end cells of separate series of cells constituting the secondary-battery installation. A practicable method of accomplishing this result is to provide in a prominent situation in the engine-room a row of incandescent lamps corresponding in number to the end cells of the series or batteries of cells and to furnish the main or battery switch with attachments which, coming into contact with adjacent devices one after another as the battery-switch moves, will complete auxiliary or local circuits, one for each indicator-lamp, causing the lamps to light up successively as each end cell is reached by the battery-switch. On numbering the lamps as the end cells are numbered the engineer understands that series or battery of cells to be charging or discharging to which the particular lamp alight in the row of lamps relates. When, however, there are as many as twenty end cells, and it is desired to exhibit the position of the switch by means of a lamp-indicator, the row of lamps becomes too long and occupies too much space and is, furthermore, not so quickly read as a smaller number of lamps. A ten-lamp indicator is very convenient and readable in size; and the object of my invention is to assemble means for indicating by the use of ten lamps on which one of the twenty end cells the battery-switch may be at any time. I accomplish this object by sending the indicator-current to each lamp in one position of the switch through a suitable resistance, whereupon the lamp glows feebly, and in the next position of the switch directly to the lamp without the resistance, causing full light. Thus each lamp may indicate two positions, usually next each other, of the battery-switch.

Each constituent element of my invention is described in detail and its individual office, together with the mode of operation of the whole, fully explained hereinbelow.

Figure 2:
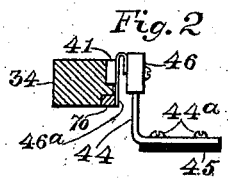

Figure 1 of the accompanying drawings is a front and partly diagrammatic view of my invention, and Fig. 2 is a side view of the knee and attachments.

Like numbers mark like parts throughout.

Considering the drawings, numeral 1 designates a case of any selected material, usually rectangular in form and adapted to be attached to the switchboard or engine-room walls. The case ordinarily possesses a hinged and glazed door 2, through which the lamps 3, 4, 5, 6, 7, 8, 9, 10, 11, and 12 appear. There are ten lamps shown.

Number 13 marks the conductor from the source of the indicator-current, whatever that source may be, and from this conductor the wires 14, 15, 16, 17, 18, 19, 20, 21, 22, and 23 extend to the lamps, as shown, and the wires 24, 25, 26, 27, 28, 29, 30, 31, 32, and 33 lead from the lamps. These two sets of wires form local lamp-circuits.

Number 34 marks a bar of wood or other non-conducting substance supported by the back board 35 of the box 36, containing the end cells.

The battery-switch is marked 37, and it may be moved along from one position to another by the longitudinal threaded rod 38, engaging a nut 39 under the switch. Any form of laterally-movable battery-switch and actuating mechanism may be used with my invention.

At intervals along bar 34 are embedded the twenty contact-plates, of which the first four are referred to in this description and numbered 40, 41, 42, and 43.

Upon the upper surface of the switch will be noted the metal knee 44, a layer of insulation 45 separating it from actual contact with the switch. Screws 44ª, engaging slots 44ᵇ, cut lengthwise through the horizontal portion of knee 44, permit a slight forward or backward adjustment of the knee upon the battery-switch. About the upwardly-extending leg of knee 44 is secured a sleeve 46, having a rearwardly-located brush or spring 46ª. (See Fig. 2.) This brush meets the contact-plates 40, 41, 42, 43, and the remaining sixteen of them one after the other as the switch is moved along to the right. It is customary to place the twenty contact-plates directly above the twenty end-cell plates or contacts for the battery-switch. Switch 37 is shown on cell-contact 47, which is the second from the left, and for purposes of this description I have numbered the next two cell-plates 48 and 49.

In Fig. 1 it will be observed that the wires 24, 25, 26, 27, 28, 29, 30, 31, 32, and 33 from the lamps run directly to the second, fourth, sixth, eighth, tenth, twelfth, fourteenth, sixteenth, eighteenth, and twentieth contact-plates embedded in the bar 34 and that near the bar each of those wires is provided with a branch. Numbers 50, 51, 52, 53, 54, 55, 56, 57, 58, and 59 mark the branch wires, and numbers 60, 61, 62, 63, 64, 65, 66, 67, 68, and 69 refer to resistance-coils included in the branches. For coils I may substitute lamps, which are in this situation equivalent to resistance-wires. The branch wires are connected in numerical order with the first, third, fifth, seventh, ninth, eleventh, thirteenth, fifteenth, seventeenth, and nineteenth contact-plates embedded in bar 34.

Immediately below the bar 34 there is fixed a conducting-strip 70, and the brush 46 is constantly in contact with the strip. At the right a wire 71 leads to ground or returns to the source of the indicator-current to complete the circuit. It is believed to be clear, therefore, that with the switch in the position shown and the brush electrically joining the second contact-plate 41 of the bar 34 and the strip 70 the full current passes to the first lamp on the left, designated by number 3. If the switch were moved back to the first end cell and the brush consequently caused to connect the first contact-plate 40 and the longitudinal strip 70, the first indicator-lamp 3 would glow with only partial light. The engineer, understanding the arrangement, would learn thus that the first end cell was engaged by the battery-switch and on observing full light in the first lamp 3 that the second end cell was in circuit. Similarly, if the second lamp 4 of the indicator glows feebly it follows that the second resistance 61 must be included in the indicator-circuit and that the battery-switch is upon end cell 48—that is, the third cell. Full light of second lamp 4 informs the observer that the fourth end cell has been reached by the battery-switch. The remaining connections mentioned produce corresponding effects upon the balance of the row of lamps as switch 37 travels to the right.

Having thus described my invention, what I claim as new, and desire to secure by Letters Patent of the United States, is—

1. In an indicator, the combination of indicator-lamps, an indicator-circuit and local lamp-circuits extending therefrom to each lamp, a movable body adapted to be brought into a plurality of consecutive positions, and devices constructed and arranged to close the indicator-circuit through the local lamp-circuits successively and to reduce the light proceeding from each lamp as the said movable body reaches certain of its predetermined positions and to permit full lamplight at the remaining positions of the said body.

2. In an indicator of the character described, the combination of an indicator-lamp, an indicator-circuit, a local lamp-circuit extending from the said indicator-circuit through the lamp and having one end divided into two branches, a resistance included in one of the said branches, a movable battery-switch and devices actuated by the movement of the switch whereby the indicator-circuit is completed through the lamp by way of said branches one after another including and excluding the said resistance, substantially as described.

3. In an indicator, the combination of an indicator-lamp, an indicator-circuit, a local lamp-circuit derived from the said indicator-circuit, a movable body adapted to be brought into different positions, a resistance, and means actuated and governed by the movable body whereby the said resistance may be included in circuit with the lamp at one position of the said movable body and cut out at another position, substantially as described.

4. In a battery-end-cell switch-indicator, the combination of the indicator-lamps, an indicator-circuit and local lamp-circuits extending therefrom through each lamp, the said local lamp-circuits having each a terminal portion divided into two branches, resistances included in one of the branches of each local lamp-circuit, a movable battery-switch, and devices actuated by the movement of the said battery-switch whereby the indicator-circuit is completed through the said branches of the local lamp-circuits one after another in correspondence with predetermined positions successively attained by the switch, substantially as described.

5. In a battery-end-cell switch-indicator, the combination of the indicator-lamps, an indicator-circuit and local lamp-circuits extending therefrom through each lamp, the said local lamp-circuits having each a terminal portion divided into two branches, suitably-supported contact-plates connected with the said branches, resistances included in one branch of each of the said local lamp-circuits, a movable battery-switch, a knee secured upon and insulated from the said switch, a conducting-brush borne by the knee, a conductor-strip in the said indicator-circuit arranged to be constantly in contact with the said brush, the brush meeting the said contact-plates and joining them electrically one after another to the said conductor-strip, substantially as described.

In testimony whereof I affix my signature in presence of two witnesses.

ARTHUR C. WALTHER.

Witnesses:
 STANLEY COOKE,
 ELIZABETH S. DAY.